US012645570B2

(12) United States Patent
    Singh

(10) Patent No.: US 12,645,570 B2
(45) Date of Patent: Jun. 2, 2026

(54) METHOD AND SYSTEM FOR OPTIMIZING TESTING AND DEPLOYMENT OF AN APPLICATION

(71) Applicant: JPMorgan Chase Bank, N.A., New York, NY (US)

(72) Inventor: Amit Singh, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 183 days.

(21) Appl. No.: 18/101,428

(22) Filed: Jan. 25, 2023

(65) Prior Publication Data

US 2024/0168868 A1      May 23, 2024

(30) Foreign Application Priority Data

Nov. 21, 2022    (IN) .............................. 202211066814

(51) Int. Cl.
    *G06F 11/3668*        (2025.01)
    *G06F 11/3698*        (2025.01)
(52) U.S. Cl.
    CPC ...... *G06F 11/3688* (2013.01); *G06F 11/3692* (2013.01); *G06F 11/3698* (2025.01)
(58) Field of Classification Search
    CPC ............. G06F 11/3688; G06F 11/3664; G06F 11/3692
    See application file for complete search history.

(56) References Cited

U.S. PATENT DOCUMENTS

| | | | | |
|---|---|---|---|---|
| 9,021,458 B1 * | 4/2015 | Jacob | .................. | G06F 11/3688 |
| | | | | 717/168 |
| 9,916,233 B1 * | 3/2018 | Qureshi | .............. | G06F 11/3688 |
| 10,691,514 B2 * | 6/2020 | McClory | ............. | G06F 11/3684 |
| 11,443,047 B2 * | 9/2022 | Sekhar | .................. | H04L 9/3239 |
| 2013/0152047 A1 * | 6/2013 | Moorthi | .............. | G06F 11/3698 |
| | | | | 717/124 |
| 2015/0277901 A1 * | 10/2015 | Karle | .................. | G06F 11/3688 |
| | | | | 717/120 |
| 2017/0180487 A1 * | 6/2017 | Frank | .................. | G06F 11/3688 |
| 2017/0220403 A1 * | 8/2017 | Maag | .................. | G06F 11/3692 |
| 2018/0253296 A1 * | 9/2018 | Brebner | .............. | G06F 11/3688 |
| 2018/0321918 A1 * | 11/2018 | Mcclory | ............. | G06F 11/3688 |
| 2018/0324204 A1 * | 11/2018 | McClory | ............. | G06F 11/3684 |
| 2018/0336123 A1 * | 11/2018 | Benes | ................. | G06F 11/3692 |
| 2021/0248058 A1 * | 8/2021 | Hattingh | ............. | G06F 11/3664 |
| 2022/0137981 A1 * | 5/2022 | Goddard | ................. | G06F 9/445 |
| | | | | 713/2 |

\* cited by examiner

*Primary Examiner* — Wei Y Mui
*Assistant Examiner* — Brahim Bourzik
(74) *Attorney, Agent, or Firm* — GREENBLUM & BERNSTEIN, P.L.C.

(57) ABSTRACT

A solution for optimizing the deployment of applications in a cloud-based environment is provided. A method for optimizing the deployment of applications in a cloud-based environment is disclosed. The method is implemented by at least one processor. The method includes receiving at least one user artifacts file for direct deployment on a test environment. Next, the method includes deploying the at least one user artifacts file onto the test environment. Next, the method includes performing a set of testing events on artifacts included in the at least one user artifacts file. Thereafter, the method includes transmitting the at least one user artifacts file for pipeline deployment based on a successful result of the testing events.

12 Claims, 4 Drawing Sheets

200

Smart Deployment Tool (SDT) Device 202

Communication Network(s) 210

Server Device 204(1)

Database 206(1)

Server Device 204(n)

Database 206(n)

Client Device 208(1)

Client Device 208(n)

400

402 Start

404 RECEIVE USER ARTIFACTS FILES FOR DIRECT DEPLOYMENT ON A TEST ENVIRONMENT

406 DEPLOY USER ARTIFACTS FILES ONTO THE TEST ENVIRONMENT

408 PERFORM A SET OF TESTING EVENTS ON THE DEPLOYED USER ARTIFACTS

410 TRANSMIT USER ARTIFACTS FOR PIPELINE DEPLOYMENT BASED ON SUCCESSFUL TESTING EVENTS

412 End

METHOD AND SYSTEM FOR OPTIMIZING TESTING AND DEPLOYMENT OF AN APPLICATION

CROSS-REFERENCE TO RELATED APPLICATIONS

This application claims priority benefit from Indian Application No. 202211066814, filed Nov. 21, 2022 in the Indian Patent Office, which is hereby incorporated by reference in its entirety.

FIELD OF THE DISCLOSURE

This technology generally relates to methods and systems for optimizing the testing and deployment of the application and more particularly to methods and systems for optimizing the deployment of the application directly in the Development (Dev)/User Acceptance Testing (UAT) cloud-based environment to avoid the repetition of Continuous Integration (CI)/Continuous Deployment (CD) deployment pipelines for an application testing.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

During the software development lifecycle (SDLC), developers used to build multiple codes for their single program or software. It is known that developers have to deploy the code to Development (Dev) or User Acceptance Test (UAT) environment using various pipelines such as Jules, Jenkins, etc. The tool uses Continuous Integration (CI)/Continuous Deployment (CD) pipelines to build, test and deploy software in the UAT environment. A pipeline is a process that drives software development through a path of building, testing, and deploying code, etc. A developer has to deploy multiple times using these pipelines until the developer gets the code right. While pipelines have necessary steps like versioning, initializing, check out, publishing, scans, etc. before the deployments but these can be redundant/time-wasting for multiple builds with small code changes until the developer gets their code right.

The developer builds their code and commits it to bit-buckets like Git-based code hosting and collaboration tool, built for the teams. This type of tool uses sets of CI/CD pipelines to deploy the code in the Dev environment which can take approximately 15-45 minutes and when the same code is promoted to UAT, the pipeline takes approximately 30-60 minutes given the extra scans in UAT environment to deploy the code. Hence a developer has to wait for around 75-105 minutes to test their build. Usually, for developers, it takes multiple builds to get the feature or functionality right. A developer on average can take up to around 6 to 9 builds depending on the program to get their code right. As a result, the developer's precious time is wasted in such repetition and waiting for the code to be ready to test on the Dev/UAT environment. Evidently, the developer's application deployment and testing time is extended, going through cumbrous tasks, and reducing the productivity of the Software Development Lifecycle (SDLC) in this competitive world.

Hence, in view of these and other existing limitations, there arises an imperative need to provide an efficient solution to overcome the above-mentioned limitations and to provide a method and system for optimizing the testing and deployment of the application.

SUMMARY

The present disclosure, through one or more of its various aspects, embodiments, and/or specific features or sub-components, provides, inter alia, various systems, servers, devices, methods, media, programs, and platforms for optimizing testing and deployment of the application.

According to an aspect of the present disclosure, a method for optimizing a deployment of an application in a cloud-based environment is disclosed. The method is implemented by at least one processor. The method includes receiving, by at least one processor, at least one user artifacts file for direct deployment on a test environment. Next, the method includes deploying, by the at least one processor, the at least one user artifacts file onto the test environment. Next, the method includes performing, by the at least one processor, a set of testing events on the artifacts included in the at least one user artifacts file. Thereafter, the method includes transmitting, by the at least one processor, the at least one user artifacts file for pipeline deployment based on a successful result of the testing events.

In accordance with an exemplary embodiment, the at least one user artifacts file include at least one user executable file and at least one configuration file.

In accordance with an exemplary embodiment, the cloud-based environment corresponds to a development and the test environment for the deployment of the application, wherein the cloud-based environment includes a public or private cloud-based environment.

In accordance with an exemplary embodiment, deploying the at least one user artifacts file onto the test environment using at least one processor includes steps of processing, by the at least one processor, the at least one user executable file, and the at least one configuration file. Next step includes retrieving, by the at least one processor, the received at least one executable file and stored user configuration files. Next the method includes the step of performing, by the at least one processor, at least one application programming interface call for communication between a server and the application. Next the method includes the step of merging, by the at least one processor, the deployed at least one user executable file and the stored configuration files for each set of testing events.

In accordance with an exemplary embodiment, the at least one processor performs the set of testing events on the deployed at least one user artifacts file using at least one testing technique.

In accordance with an exemplary embodiment, the method further includes the step of notifying, by the at least one processor, the set of testing events to the user based on the deployed at least one user artifacts file.

In accordance with an exemplary embodiment, the pipeline deployment comprises at least one Continuous Integration (CI) and Continuation Deployment (CD) stage.

According to an aspect of the present disclosure, a computing device configured to implement an execution of a method for optimizing a deployment of an application in a cloud-based environment is disclosed. The computing device including a processor; a memory; and a communication interface coupled to each of the processor and the memory. The processor is configured to receive at least one user artifacts file for direct deployment on a test environment; deploy the at least one user artifacts file onto the test environment; perform a set of testing events on artifacts included in the at least one user artifacts file; and transmit the at least one user artifacts file for pipeline deployment based on a successful result of the testing events.

In accordance with an exemplary embodiment, the at least one user artifacts file include at least one user executable file; and at least one configuration file.

In accordance with an exemplary embodiment, the cloud-based environment corresponds to a development and the test environment for the deployment of the application, wherein the cloud-based environment includes a public or private cloud-based environment.

In accordance with an exemplary embodiment, the processor is configured to deploy the at least one user artifacts file onto the test environment by processing the at least one user executable file and the at least one configuration file; retrieving the received at least one executable file and stored user configuration files; performing at least one application programming interface call for communication between a server and the application; and merging the deployed at least one user executable file and the stored configuration files for each set of testing events.

In accordance with an exemplary embodiment, the processor is configured to perform the set of the testing event on the deployed at least one user artifacts files using at least one testing technique.

In accordance with an exemplary embodiment, the processor is further configured to notify the set of testing events to the user based on the deployed at least one user artifacts file.

In accordance with an exemplary embodiment, the pipeline deployment comprises at least one Continuous Integration (CI) and Continuation Deployment (CD) stage.

According to an aspect of the present disclosure, a non-transitory computer readable storage medium storing instructions for optimizing a deployment of an application in a cloud-based environment is disclosed. The storage medium includes executable code which, when executed by a processor, may cause the processor to receive at least one user artifacts file for direct deployment on a test environment; deploy the at least one user artifacts file onto the test environment; perform a set of testing events on artifacts included in the at least one user artifacts file; and transmit the at least one user artifacts for pipeline deployment based on a successful result of the testing events.

In accordance with an exemplary embodiment, the at least one user artifacts file includes at least one user executable file; and at least one configuration file.

In accordance with an exemplary embodiment, the cloud-based environment corresponds to a development and the test environment for the deployment of the application.

In accordance with an exemplary embodiment, when executed by the processor, the executable code may further cause the processor to deploy the at least one user artifacts file onto the test environment by processing the at least one user executable file and the at least one configuration file; retrieving the received at least one user executable file and stored user configuration files; performing at least one application programming interface call for communication between a server and the application; and merging the deployed at least one user executable file and the stored configuration files for each set of testing events.

In accordance with an exemplary embodiment, when executed by the processor, the executable code may further cause the processor to perform the set of the testing events on the deployed at least one user artifacts file using at least one testing technique and notify the set of testing events to the user based on the deployed at least one user artifacts file.

In accordance with an exemplary embodiment, the pipeline deployment comprises at least one Continuous Integration (CI) and Continuation Deployment (CD) stage.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
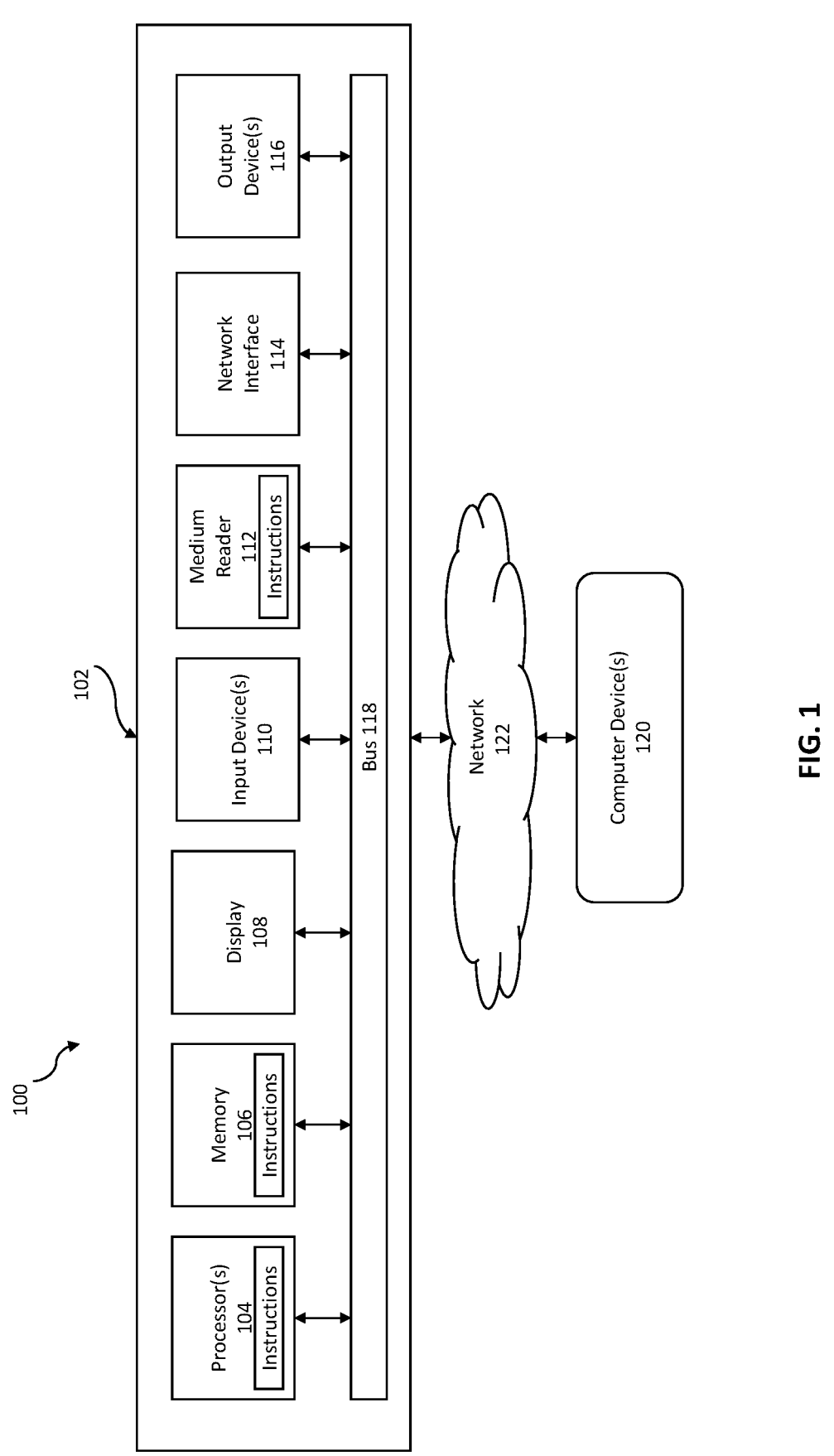
FIG. 1 illustrates an exemplary computer system.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units/controller described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent however, that the disclosure may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with the testing and deployment of an application, the present disclosure provides a solution. Conventionally, developers have to deploy their code to a Development or User Acceptance Testing (UAT) environment using tools like Jules, Jenkins, or any other pipelines for the regular deployment of the application or a program. A developer has to deploy multiple times using the Continuous Integration/Continuous Deployment (CI/CD) pipeline until the developer gets the build right. While pipelines have multiple necessary steps such as initializing, versioning, scans, etc. before the deployments and these stages are important for the deployment process but these can be redundant, cumbersome, and time-wasting for multiple builds with small feature changes in code until the developer gets their code right.

Most of the times, the developers have to get their code right for a small feature of the product which can take around ~6 to 9 iterations. Every iteration needs to be deployed into Development (Dev) environment first and then on to UAT Test Environment. The deployment of a build for a small feature in each iteration until the UAT environment can take around ~75 to 105 minutes. The deployment is done through a CI/CD pipeline and the deployment pipeline has multiple stages before it deploys the code onto the cloud-based environment.

Once the builds are successful in the Dev environment, the developer raises a Pull Request to get their code merged to the Release or Develop or Master Branch. Next, the code is merged, and the CI/CD Pipelines are again triggered to deploy the code into the UAT environment. CI/CD Pipelines have to go through multiple stages again for each iteration. For example: Check Out, Initialize, Build, Code Scan, Aim Publish, Nio Tollgate stage, etc., before it deploys code to UAT or Test environment. The UAT or Test environment pipeline has extra steps than a development pipeline. This process of deployment to the UAT environment can take around ~30-60 minutes. Just deploying the code in UAT to do some testing can take around ~75-105 minutes. Next, the functional testing is done, and if it fails the process starts again from the First step. While every stage of the pipeline is necessary till the last finalized iteration, but these repetitive pipeline stages can be very redundant, time-wasting, and unnecessary for all the rest of the iterations even for a small change in the code. Hence a developer has to wait for around ~75-105 minutes to test their build. Usually, for developers, it takes multiple builds in multiple iterations to get the feature or functionality right. With the current flow, each iteration takes longer than ~75-105 minutes to be deployed and tested.

The present disclosure solves the above-mentioned problem and provides a solution for optimizing the testing and deployment of the application in Dev and UAT cloud-based environments. The developer writes their code and builds it in the local environment. The developer artifacts files are uploaded on the platform like the smart deplorer tool and the set of artifacts is processed further. Next, the set of events like functional or development testing is performed on the deployed artifacts files. The testing result is notified for the processed artifacts files such as "Fail" or "Pass", "Error" or "Success" etc. Next, on the successful deployment of the artifacts files after testing, the files are transmitted for regular pipeline deployment onto cloud-based environments like UAT, GitHub, etc. Once the developer commits and pushes the code to a central code repository E.g.: bitbucket, Jenkins, etc., this triggers the CI/CD pipelines and the pipeline goes through various stages like Check Out, Initialize, Build, Code Scan, Aim Publish, Pre Deploy etc. before it deploys the code into Dev environment. In an exemplary embodiment, this process of deployment to the Dev environment can take around ~15-45 minutes which is less than the deployment time on the UAT environment that takes around ~75-105 minutes to test a build.

The developers need to test their build in a cloud-based environment as they are accessible to every team member to test their build together and testing in the cloud-based environment is entirely a different platform than the local system. The developer builds an application to directly deploy in cloud-based environments as the UAT databases are more in synchronization with product databases and have to undergo deployment pipelines frequently even for small changes. The present disclosure provides a Dev/UAT environment for testing the build code in the local environment and after successful testing, deploying the same code onto the UAT environment. This procedure of deployment saves waiting time and increases the efficiency of the test code and the application that is developed overall.

Further, instead of deploying through CI/CD pipelines in every iteration of the code test, the developer can use the tool to deploy the code in the local environment. Firstly, the developer writes code for a program in their local system. The code i.e., the executable file which is to be tested is uploaded on this tool with the configuration files of the application. The configuration files received are stored for further iteration of the same test code deployment. Further, the process of uploading the executable files continues until the deployment is successful. Once the developer gets the code right, he has to perform one more build which is through the CI/CD pipelines on the UAT cloud-based environment.

In an example, a developer takes 7 builds in a UAT environment to get the code right. The saving time could be determined by: Number of builds to get the code right in UAT*(90 minutes (time taken to deploy the build into UAT through the pipeline)−7 minutes (time taken to deploy using the tool developed))−90 minutes (After getting their code right, user perform one more build which goes through CI/CD process to deploy the code into UAT). In this exemplary case: 7 builds*(90 minutes−7 minutes=83 minutes)−90 minutes=(7*83)−90=(581-90)=491 minutes saved per new functionality developments.

In an example, a developer or user writes a code or a program X, let's say "Code for uploading files online". In the first step, the developer has to write one or more artifacts for the same program X and build it in a local environment such as Code A—"Code for uploading word or pdf file", Code B—"Code of uploading image file" or Code C—"Code of uploading audio file" etc. Next, he has to test Code C for program X in Dev/UAT environment. The developer uploads the configuration file of the program X with an executable Code C file for deployment on the platform provided by the present invention. Code C is uploaded and deployed on this platform. There are two scenarios after the deployment, Scenario-1 "Successful testing" and scenario-2 "Failed testing". In scenario 1, after the successful deployment of Code C, it is merged with program X and again deployed for final functional testing. Once the testing is successful then the merged file of program X with code C is transmitted for deploying successfully onto Dev/UAT cloud-based environment in one go.

Further, in Scenario-2, if the Code C failed testing then the developer or user again has to undergo the first step where he modifies or re-writes the Code C for deployment on the platform. This iteration follows until the developer does not get the Code C right for the program X. Similarly, the other developers working on the same program X can perform testing and deployment of their builds simultaneously without repeating the CI/CD pipeline unnecessarily for each iteration before the final deployment onto the central repository like Bitbucket, etc. Thus, the present disclosure provides an efficient solution for optimizing the deployment of the application onto the cloud-based environment in lesser time and in an efficient manner.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such a cloud-based computing environment.

In a networked deployment, the computer system 102 may operate in the capacity of a server or as a client user computer in a server-client user network environment, a client user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, a Developer (Dev) or User Acceptance Test (UAT) environment is a testing environment provided for the developer, client, end-users, tester etc. In Dev environment application/system development have certain tasks such as designing, programming, debugging, etc. that take place. It is a test carried out by the software developers who made the functions at the local environment. While the UAT is a cloud-based environment that allows end-users to give the development team valuable feedback about the application/system in real-world scenarios before launching the product/application in the market.

As used herein, the Continuous Integration and Continuous Development (CI/CD) pipeline is a series of steps that must be performed in order to deliver a new version of the software. These steps include building, packaging, testing, validating, verifying infrastructure, initializing, checkout, and deploying into all necessary environments. A CI/CD pipeline can be triggered by an event such as a pull request from a source code repository whenever a code change. These CI/CD pipelines are a practice focused on improving software delivery throughout the software development life cycle.

As used herein, Cloud Foundry (CF) is a command line that is used to manage apps, service instances, spaces, users' information for authentication, etc. in a cloud-based environment and Application Programming Interface (API) calls or API requests, is a message sent to a server asking an API to provide a service or information. An API call is a request made by an application program to another computer program in order to access its functionality.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present invention, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide an optimized methods and systems for the deployment of applications onto a cloud-based environment.

Figure 2:
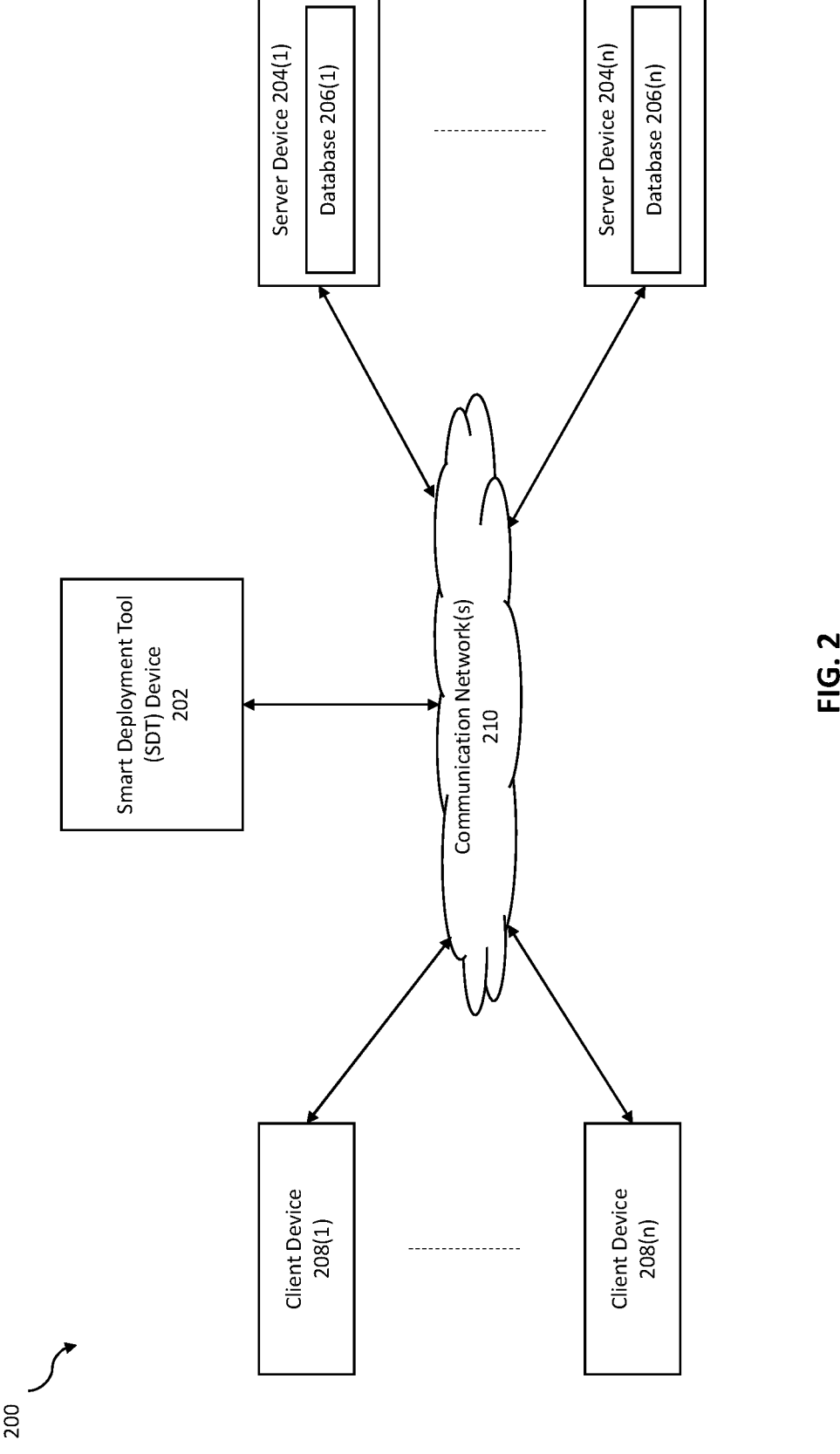
FIG. 2 illustrates an exemplary diagram of a network environment.

Referring to FIG. 2, a schematic of an exemplary network environment 200 for implementing a method for optimizing the testing and deployment of applications in a cloud-based environment is illustrated. In an exemplary embodiment, the method is executable on any networked computer platform, such as, for example, a personal computer (PC).

The method for optimizing deployment of an application onto a cloud-based environment is implemented by a Smart Deployment Tool (SDT) device 202. The SDT device 202 may be the same or similar to the computer system 102 as described with respect to FIG. 1. The SDT device 202 may store one or more applications that can include executable instructions that, when executed by the SDT device 202, cause the SDT device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the SDT device 202 itself, may be located in virtual server(s) running in a cloud-based computing environment rather than being tied to one or more specific physical network computing devices. Also, the application(s) may be running in one or more virtual machines (VMs) executing on the SDT device 202. Additionally, in one or more embodiments of this technology, virtual machine(s) running on the SDT device 202 may be managed or supervised by a hypervisor.

In the network environment 200 of FIG. 2, the SDT device 202 is coupled to a plurality of server devices 204(1)-204(n) that hosts a plurality of databases 206(1)-206(n), and also to a plurality of client devices 208(1)-208(n) via communication network(s) 210. A communication interface of the SDT device 202, such as the network interface 114 of the computer system 102 of FIG. 1, operatively couples and communicates between the SDT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SDT devices that efficiently implement a method for optimizing deployment of an applications onto a cloud-based environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The SDT device 202 may be a standalone device or integrated with one or more other devices or apparatuses, such as one or more of the server devices 204(1)-204(n), for example. In one particular example, the SDT device 202 may include or be hosted by one of the server devices 204(1)-204(n), and other arrangements are also possible. Moreover, one or more of the devices of the SDT device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the SDT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to receive raw speech data, processed speech data, encoded text into image data, embedded image into diagram data, data associated with machine learning models.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud-based architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the SDT device 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the SDT device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the SDT device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDT device 202, the server devices 204(1)-204(*n*), or the client devices 208(1)-208(*n*), for example, may be configured to operate as virtual instances on the same physical machine. In other words, one or more of the SDT device 202, the server devices 204(1)-204(*n*), or the client devices 208(1)-208(*n*) may operate on the same physical device rather than as separate devices communicating through the communication network(s) 210. Additionally, there may be more or fewer SDT devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
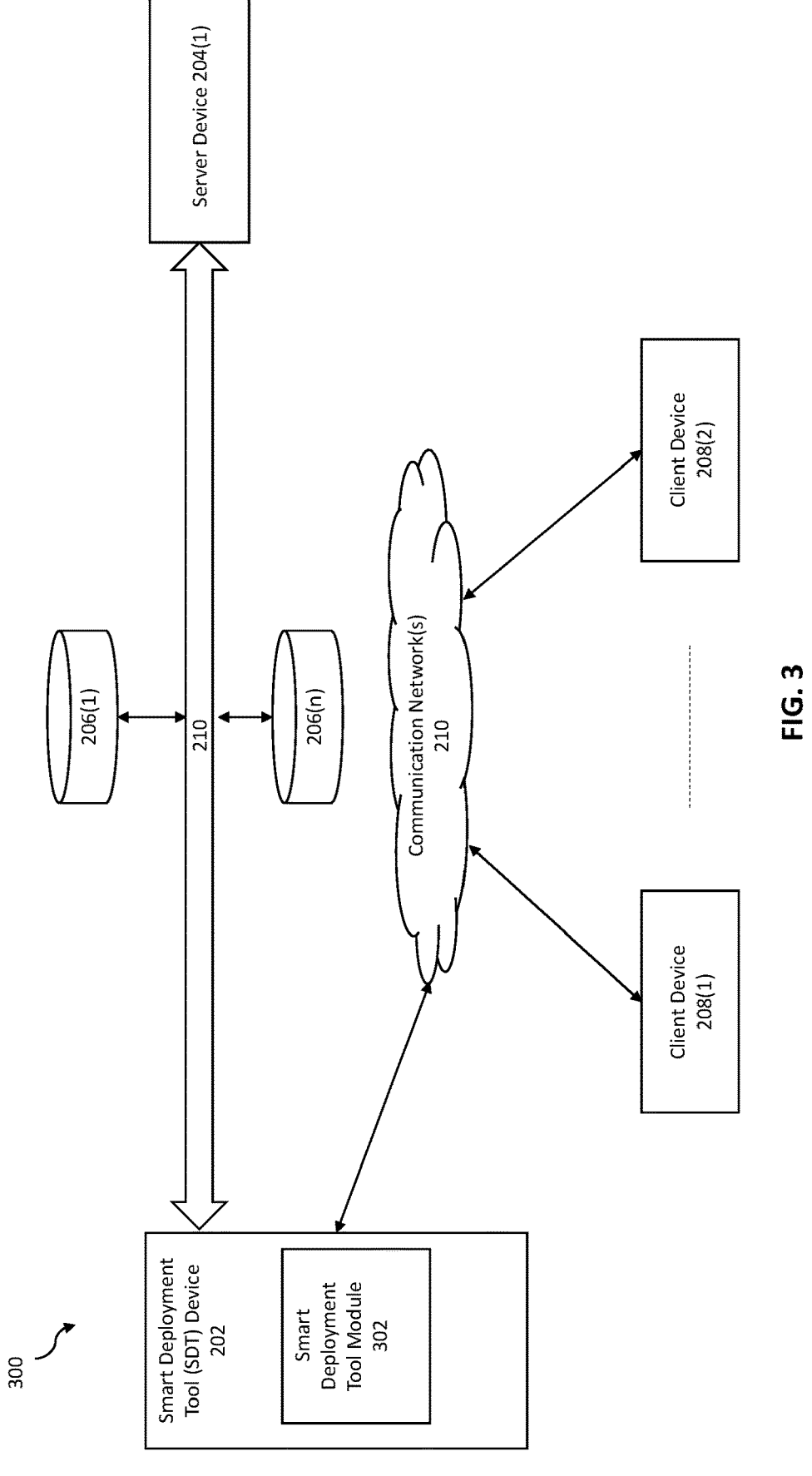
FIG. 3 shows an exemplary system for implementing a method for optimizing the testing and deployment of applications in a cloud-based environment, in accordance with an embodiment of the present disclosure.

FIG. 3 shows an exemplary system for implementing a method for optimizing the testing and deployment of applications in a cloud-based environment, in accordance with an embodiment of the present disclosure. As illustrated in FIG.

3, according to exemplary embodiments, the system 300 may comprise an SDT device 202 including an SDT module 302 that may be connected to a server device 204(1) and one or more repository 206(1) . . . 206(*n*) via a communication network 210, but the disclosure is not limited thereto.

The SDT device 202 is described and shown in FIG. 3 as including Smart Deployer Tool module 302, although it may include other rules, policies, modules, databases, or applications, for example. As will be described below, the Smart Deployment Tool module 302 is configured to implement a method for optimizing the testing and deployment of applications in a cloud-based environment.

An exemplary process 300 for implementing a mechanism for optimizing the testing and deployment of applications in a cloud-based environment by utilizing the network environment of FIG. 2 is shown as being executed in FIG. 3. Specifically, a first client device 208(1) and a second client device 208(2) are illustrated as being in communication with SDT device 202. In this regard, the first client device 208(1) and the second client device 208(2) may be "clients" of the SDT device 202 and are described herein as such. Nevertheless, it is to be known and understood that the first client device 208(1) and/or the second client device 208(2) need not necessarily be "clients" of the SDT device 202, or any entity described in association therewith herein. Any additional or alternative relationship may exist between either or both of the first client device 208(1) and the second client device 208(2) and the SDT device 202, or no relationship may exist.

Further, SDT device 202 is illustrated as being able to access the one or more repositories 206(1) . . . 206(*n*). The Smart Deployment Tool Module 302 may be configured to access these repositories/databases for implementing a method for optimizing deployment of an application onto a cloud-based environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SDT device 202 via broadband or cellular communication. Of course, these embodiments are merely exemplary and are not limiting or exhaustive.

Figure 4:
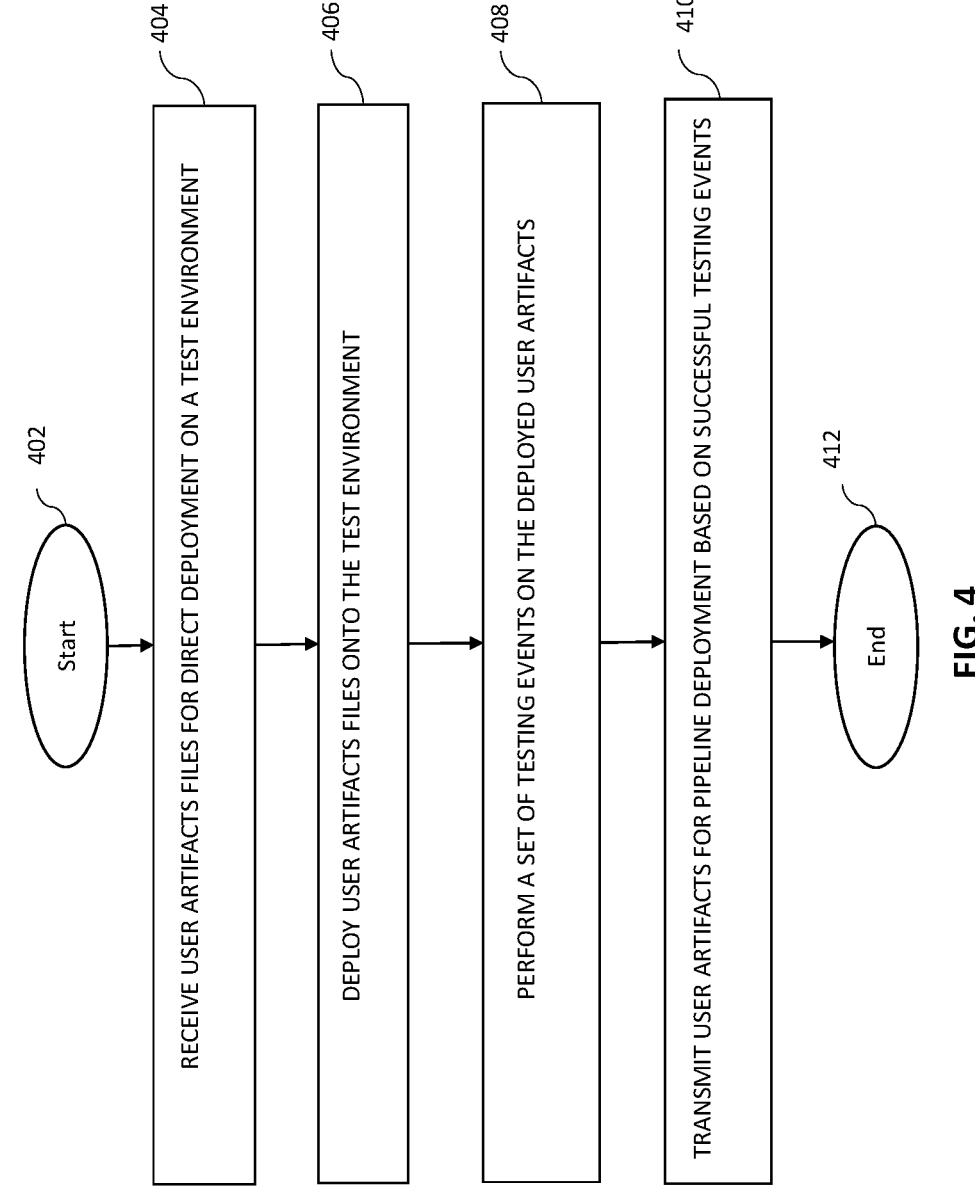
FIG. 4 illustrates an exemplary method flow diagram for optimizing the testing and deployment of applications in a cloud-based environment, in accordance with an embodiment of the present disclosure.

Referring to FIG. 4, an exemplary method is shown for optimizing the testing and deployment of applications in a cloud-based environment, in accordance with an embodiment of the present disclosure. As shown in FIG. 4, the method begins at step following a need to optimize the deployment of an application.

At step [404], the method comprises receiving, by at least one processor, at least one user artifacts file for direct deployment on a test environment. The user artifacts file comprises at least one configuration file and one executable file for deployment. The configuration file or config file contains data about a specific user, program, computer, or file that used to configure the parameters of settings, initializing source file imported, log files stored during the program etc. The executable file is a computer file that contains an encoded sequence of instructions to perform certain functions, operations etc. executed directly by the user/developer. The cloud-based environment corresponds to development and test environment such as Dev or UAT environment. In an example, a developer X writes a code A "This is a square code for a program Geometry". Next, the program Geometry comprises configuration file(s) such as program source file settings, plug-in, log files etc. and executable file(s) such as code A, uploaded by the user/developer on a cloud-based platform for deployment. In an embodiment, one or more users may also write their executable file for deployment and can upload only the executable file such as code N "This is a triangle code for program Geometry" of the second user. The configuration file is already uploaded during the deployment of the code A test program and the executable file is uploaded for each deployment of the same program till the code gets right.

At step [406], the method comprises deploying, by the at least one processor, the user artifacts file(s) onto the test environment. The deployment of the user artifacts file(s) are processed by at least one processor for executable and configuration file(s) when received. These artifacts files comprise stored configuration file(s) and the received executable file(s) that are retrieved for performing by the at least one application programming interface call internally in order to establish communication between the server and the applications requested from the applications onto a cloud-based environment. Finally, the user deployed artifacts file(s) are merged with the stored configuration file(s) for each set of testing of the user application after establishing a successful request Application Programming Interface (API) request in the next stage. Also, the cloud-based environment corresponds to the development and the test environment for the deployment of the application.

At step [408], the method includes performing, by the at least one processor, a set of testing events on the deployed user artifacts file(s). The set of the testing events on the deployed user artifacts file(s) are performed using various testing techniques such as functional testing, development testing, integration testing, end-to-end testing etc. The testing techniques are used to ensure changes to the developer code working as expected within the program or not. The technique like functional testing is a type of testing that is performed for functional specifications to establish application feature working in compliance with the end user's expectations. Further, testing like integration testing verifies that different modules or services used by the application work well together and that it requires different components or modules of an application to function together in a program.

Next, after conducting the set of testing on the deployed user artifacts file(s), the results are notified by at least one processor to the user based on the deployed user artifacts file(s) displaying successful or failed testing for the user artifacts file(s) when merged with the master branch of the program.

At step [410], the method includes transmitting, by the at least one processor, the at least one user artifacts file for pipeline deployment based on the successful testing events. The set of successful user artifacts file(s) for pipeline deployment and testing onto a cloud-based environment is performed by at least one central repository such as Bitbucket, Jules, and Jenkins etc. A central repository is a collection of stored data from existing databases merged so that developers and/or user teams can share, analyse, or update it as required. It is usually deployed by consolidating the data from multiple sources. Next, the set of user artifacts file(s) on successful deployment is transferred for further processing by at least one continuous integration and deployment stage involving initializing, check out, release, scanning etc. Developers performing continuous integration merge their changes back to the main branch for deployment. The changes are validated by creating a build and running automated tests against the build during continuous integration. While Continuous Deployment (CD) is a strategy in software development where code changes to an application are released automatically into the production environment, CD makes sure the changes that pass through the stages of production are released to the end users as expected. Thus, the present disclosure provides a method and system for optimizing the deployment of an application by removing CI/CD deployment iteration, the method terminates at step [412].

Accordingly, with the technology of the present disclosure, an optimized process for optimizing deployment of the applications is disclosed. As evident from the above disclosure, the present solution provides a significant technical advancement over the existing solutions by optimizing deployment of the applications. Further, the solution increases efficiency of the application deployment and testing in a cloud-based environment without repeating the CI/CD stages for every test build of a user artifacts file.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer readable storage medium storing instruction for optimizing deployment of applications in a cloud-based environment is disclosed. The storage medium includes executable code which, when executed by a processor, may cause the processor to receive at least one user artifacts file for direct deployment on a test environment; deploy the at least one user artifacts file onto the test environment; perform a set of testing events on the deployed user artifacts file(s); and transmit the at least one user artifacts file for pipeline deployment based on the successful testing events.

In accordance with an exemplary embodiment, the at least one user artifacts file include at least one user executable file and at least one configuration file. In accordance with an exemplary embodiment, the cloud-based environment corresponds to a development and the test environment for the deployment of the application. In accordance with an exemplary embodiment, the processor is configured to deploy the at least one user artifacts file onto the test environment by processing the executable file(s) and the configuration file(s); retrieving the stored user configuration file(s) and the received executable file(s); performing at least one application programming interface call for communication between the server and the applications; and merging the deployed user executable file(s) and the stored configuration file(s) for each set of testing events. In accordance with an exemplary embodiment, the processor is configured to perform the set of the testing events on user deployed user artifacts file(s) using at least one testing technique and notify the set of testing events to the user based on the deployed user artifacts file(s). In accordance with an exemplary embodiment, the pipeline deployment based on the successful testing events comprises of at least one Continuous Integration (CI) and Continuation Deployment (CD) stages.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for optimizing a deployment of an application in a cloud-based environment, the method comprising:

receiving, by at least one processor, at least one user artifacts file for direct deployment on a test environment;

deploying, by the at least one processor, the at least one user artifacts file onto the test environment;

performing, by the at least one processor, a set of testing events on artifacts included in the at least one user artifacts file; and transmitting, by the at least one processor, the at least one user artifacts file for pipeline deployment based on a successful result of the testing events, wherein the at least one user artifacts file comprises:

at least one user executable file that contains an encoded sequence of instructions to perform a predetermined set of functions; and at least one configuration file that contains data that relates to at least one from among a user, a program, a computer, and a file, and that is usable for configuring parameters of settings, and wherein the method further comprises notifying, by the at least one processor, results of the set of testing events to the user based on the deployed at least one user artifacts file displaying successful or failed testing, and wherein the deploying, by the at least one processor, the at least one user artifacts file onto the test environment comprises:

processing, by the at least one processor, the at least one user executable file and the at least one configuration file;

retrieving, by the at least one processor, the received at least one user executable file and stored user configuration files;

performing, by the at least one processor, at least one application programming interface call for communication between a server and the application; and merging, by the at least one processor, the deployed at least one user executable file and the stored configuration files for each set of testing events.

2. The method as claimed in claim 1, wherein the cloud-based environment corresponds to a development and the test environment for the deployment of the application.

3. The method as claimed in claim 1, wherein the set of testing events are performed on the deployed at least one user artifacts file using at least one testing technique.

4. The method as claimed in claim 1, wherein the pipeline deployment comprises at least one Continuous Integration (CI) and Continuation Deployment (CD) stage.

5. A computing device configured to implement an execution of a method for optimizing a deployment of an application in a cloud-based environment, the computing device comprising:

a processor;

a memory; and a communication interface coupled to each of the processor and the memory, wherein the processor is configured to:

receive at least one user artifacts file for direct deployment on a test environment;

deploy the at least one user artifacts file onto the test environment;

perform a set of testing events on artifacts included in the at least one user artifacts file; and transmit the at least one user artifacts file for pipeline deployment based on a successful result of the testing events, wherein the at least one user artifacts file comprises:

at least one user executable file that contains an encoded sequence of instructions to perform a predetermined set of functions; and at least one configuration file that contains data that relates to at least one from among a user, a program, a computer, and a file, and that is usable for configuring parameters of settings, and wherein the processor is further configured to notify results of the set of testing events to the user based on the deployed at least one user artifacts file displaying successful or failed testing, and wherein the processor is further configured to deploy the at least one user artifacts file onto the test environment by:

processing the at least one user executable file and the at least one configuration file;

retrieving the received at least one executable file and stored user configuration files;

performing at least one application programming interface call for communication between a server and the application; and merging the deployed at least one user executable file and the stored configuration files for each set of testing events.

6. The computing device as claimed in claim 5, wherein the cloud-based environment corresponds to a development and the test environment for the deployment of the application.

7. The computing device as claimed in claim 5, wherein the processor is configured to perform the set of testing events on the deployed at least one user artifacts file using at least one testing technique.

8. The computing device as claimed in claim 5, wherein the pipeline deployment comprises at least one Continuous Integration (CI) and Continuation Deployment (CD) stage.

9. A non-transitory computer readable storage medium storing instructions for optimizing a deployment of an application in a cloud-based environment, the storage medium comprising executable code which, when executed by a processor, causes the processor to:

receive at least one user artifacts file for direct deployment on a test environment;

deploy the at least one user artifacts file onto the test environment;

perform a set of testing events on artifacts included in the at least one user artifacts file; and transmit the at least one user artifacts for pipeline deployment based on a successful result of the testing events, wherein the at least one user artifacts file comprises:

at least one user executable file that contains an encoded sequence of instructions to perform a predetermined set of functions; and at least one configuration file that contains data that relates to at least one from among a user, a program, a computer, and a file, and that is usable for configuring parameters of settings, and wherein when executed by the processor, the executable code further causes the processor to notify results of the set of testing events to the user based on the deployed at least one user artifacts file displaying successful or failed testing, and wherein when executed by the processor, the executable code further causes the processor to deploy the at least one user artifacts file onto the test environment by:

processing the at least one user executable file and the at least one configuration file;

retrieving the received at least one user executable file and stored user configuration files;

performing at least one application programming interface call for communication between a server and the application; and merging the deployed at least one user executable file and the stored configuration files for each set of the testing events.

10. The storage medium as claimed in claim 9, wherein the cloud-based environment corresponds to a development and the test environment for the deployment of the application.

11. The storage medium as claimed in claim 9, wherein when executed by the processor, the executable code further causes the processor to:

perform the set of testing events on the deployed at least one user artifacts file using at least one testing technique.

12. The storage medium as claimed in claim 9, wherein the pipeline deployment comprises at least one Continuous Integration (CI) and Continuation Deployment (CD) stage.

* * * * *